United States Patent

[11] 3,628,161

[72] Inventor Ronald Lee Earp
Burlington, N.C.
[21] Appl. No. 18,887
[22] Filed Mar. 12, 1970
[45] Patented Dec. 14, 1971
[73] Assignee Bell Telephone Laboratories, Incorporated
Murray Hill, N.J.

[54] ELECTRONIC SAMPLING AND HOLD CIRCUIT
4 Claims, 1 Drawing Fig.

[52] U.S. Cl. .......... 328/151, 333/70 R, 328/65, 307/259
[51] Int. Cl. .......... H03k 17/74
[50] Field of Search .......... 328/151, 58, 14, 65, 67; 333/70 R; 307/259

[56] References Cited
UNITED STATES PATENTS

| | | | |
|---|---|---|---|
| 2,461,321 | 2/1949 | Guillemin .......... | 328/65 |
| 2,447,082 | 8/1948 | Miller .......... | 328/58 |
| 3,051,906 | 8/1962 | Haynes .......... | 328/14 |

*Primary Examiner*—Donald D. Forrer
*Assistant Examiner*—Harold A. Dixon
*Attorneys*—R. J. Guenther and William L. Keefauver

ABSTRACT: A sample and hold circuit is disclosed in which a gate is enabled to apply a wave sample to a delay line capacitor where the sample is momentarily stored. When the gate is disabled, the stored sample discharges with the line being effective to produce a relatively flat-topped output over a period of time following the disablement of the gate.

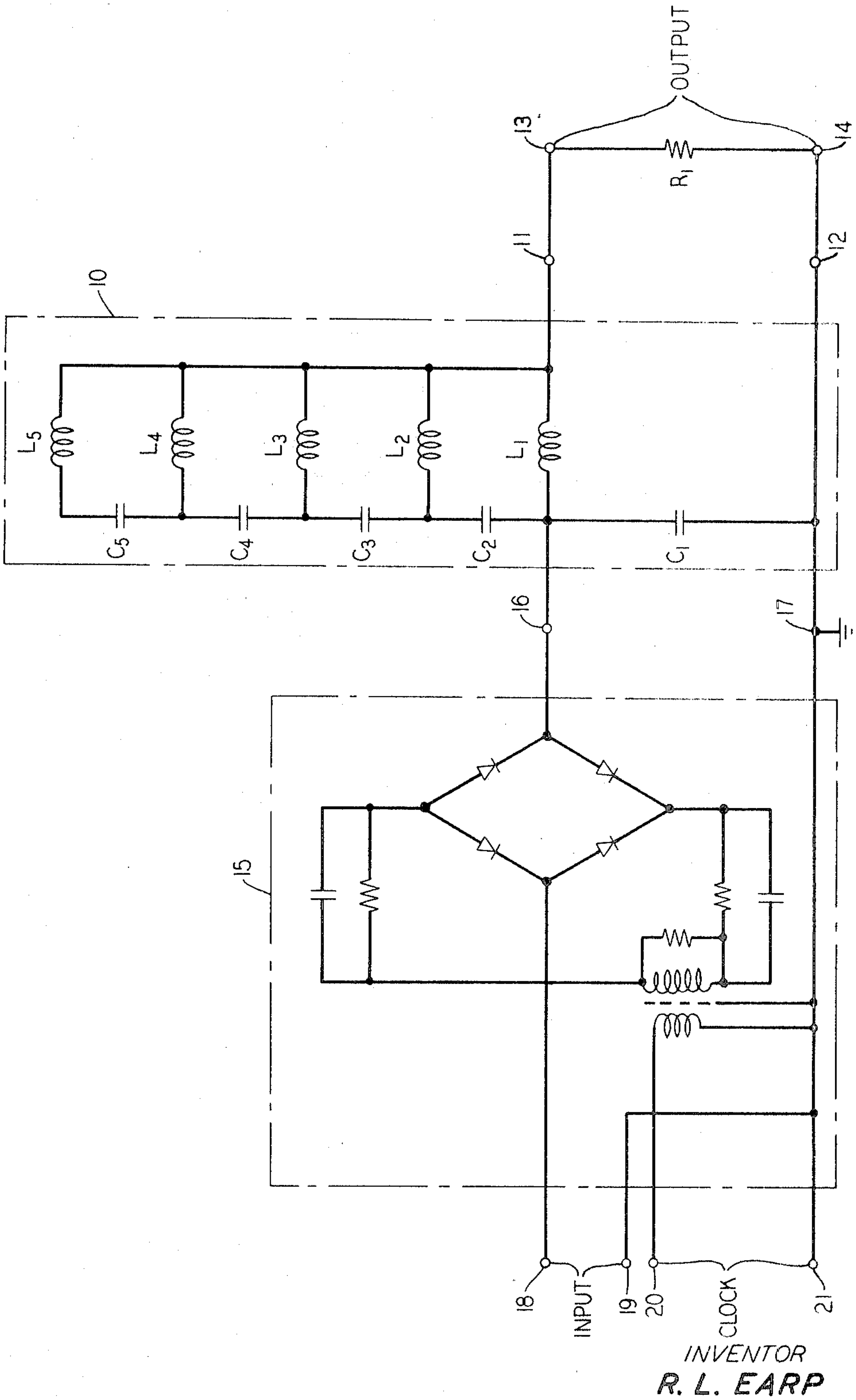
INVENTOR
R. L. EARP
BY H. L. Logan
ATTORNEY

ELECTRONIC SAMPLING AND HOLD CIRCUIT

GOVERNMENT CONTRACT

The invention herein claimed was made in the course of or under a contract with the Department of the Army.

BACKGROUND OF THE INVENTION

1. Field of the Invention

This invention relates to sample and hold circuits which produce flat-topped outputs.

2. Description of the Prior Art

Circuits for periodically sampling waves are disclosed in the prior art. Such circuits have been used, for example, to sample repetitive waves at slightly later times on successive cycles so that time-stretched versions of the original waves may be constructed for easier spectral analysis.

In many applications, sampling circuits must produce flat-topped outputs; that is they must have a holding characteristic so that their outputs maintain substantially constant amplitude levels for a period of time following each sampling period. A number of sampling circuits having this characteristic are found in the prior art but unfortunately these sample and hold circuits have frequently been found lacking from dynamic range, linearity, cost and/or reliability standpoints.

SUMMARY OF THE INVENTION

An object of the present invention is to perform a sampling and hold operation by circuitry having improved linearity, dynamic range, reliability and/or economic characteristics.

This and other objects are achieved in accordance with the invention by periodically sampling input waves and applying each sample as it is obtained to a capacitor in a constant-K, high-pass filter type of delay line. When this capacitor discharges between sampling periods, relatively flat-topped output waves are produced. The durations of these waves are directly related to the propagation velocity of the delay line so that the durations of the output waves can be determined by selecting the values of the components of the line.

Each embodiment of the invention includes a constant-K, one-port ladder network having series connected capacitors and shunt connected inductors with the element closest to the port comprising a capacitor and the element most remote from the port comprising an inductor so that the network has poles at both zero and infinite frequencies. Connected across the network port is a load having an impedance value equal to the input, or driving-point, impedance of the network. Finally, a bidirectional current sampling gate is connected to the network to periodically sample input waves and to apply each wave sample as it is obtained to the capacitor closest to the port. At the end of each sampling period, the stored sample discharges and the remainder of the network cooperates to cause a relatively flat-topped wave to appear across the load connected to the port.

The invention has a number of advantageous features. As illustrated in the disclosed embodiment, for example, embodiments may be formed using passive elements, thereby producing cost and reliability advantages. Furthermore, embodiments may readily be constructed having dynamic ranges in excess of 40 db. and accuracies of one percent or better. Still further, as the duration of the output wave is directly related to the propagation velocity of the network, one may readily design for specific durations.

These and other objects and features of the invention will become apparent from a study of the following detailed description of a specific embodiment.

BRIEF DESCRIPTION OF THE DRAWING

The drawing discloses a schematic diagram of one embodiment of the invention.

DESCRIPTION OF THE DISCLOSED EMBODIMENT

The disclosed embodiment includes a constant-K, one-port ladder network 10 having poles at both zero and infinite frequencies and, furthermore, having a capacitor as the element closest to the port. From another viewpoint, network 10 comprises a plurality of high-pass, half-section, constant-K filters connected in series so that the capacitor of each filter is closer to the port than the inductor of that filter.

From a more detailed standpoint, network 10 comprises series connected capacitors $C_1$ through $C_5$, shunt connected inductors $L_1$ through $L_5$ and port terminals 11 and 12. The first element of the network—that is, the one closest to the port—is capacitor $C_1$ with the result that the network has a pole at zero frequency. On the other hand, the last, or most remote, element is inductor $L_5$ with the result that there is also a pole at infinite frequency. The input, or driving-point, impedance of this network is defined by the expression:

$$Z(s)=\frac{1}{C_1s}+\cfrac{1}{\cfrac{1}{L_1s}+\cfrac{1}{\cfrac{1}{C_2s}+\cfrac{1}{\cfrac{1}{L_2s}+\dots}}}$$

where $Z(s)$ is the Laplace transform of the input, of driving-point, impedance, $C_1, C_2, \dots$ are the values in farads of capacitors $1, C_2, \dots$ of the network, $L_1, L_2, \dots$ are the values in henries of inductors $L_1, L_2, \dots$ of the network, and $s$ represents a complex number used in Laplace transformations. These and other characteristics of one-port ladder networks of the present type are discussed in various publications, such as Chapter 12 of the text *Network Analysis*, by M. E. Van Valkenburg (Prentice-Hall, Inc., 1955).

The disclosed embodiment also includes a load resistor $R_1$ having a resistance value substantially equal to the driving-point impedance of network 10 and connected across output terminals 13 and 14. Output terminals 13 and 14 are, in turn, connected to port terminals 11 and 12, respectively.

The disclosed embodiment further includes a bidirectional current sampling gate 15 having output terminals 16 and 17 connected to respective leads of capacitor $C_1$ of network 10. Sampling gate 15 also includes a pair of input terminals 18 and 19 for receiving waves to be sampled. Terminals 18 and 19 therefore also comprise the input terminals for the disclosed sample and hold embodiment. Gate 15 also has a pair of terminals 20 and 21 for receiving clock pulses for periodically enabling the gate. Because of its bidirectional current nature, the gate can sample both positive and negative portions of input waves to produce positive and negative samples, respectively. Furthermore, although a sample, conventional diode bridge circuit is shown in the block for gate 15, the gate, as recognized by those skilled in the art, may take any one of a number of different forms.

In operation, gate 15 is periodically enabled for periods sufficient in duration to permit capacitor $C_1$ to be charged to approximately the level of the wave being sampled but insufficient in duration to permit a significant storing or energy in any of the other elements of the network. At the termination of each enabling period, capacitor $C_1$ discharges into resistor $R_1$ and the remaining elements of the network. The energy discharged into these remaining elements produces a wave which travels down the network to inductor $L_5$ where it is inverted and reflected back toward the network port. The result of this action is to produce a substantially flat-topped voltage wave at terminals 13 and 14.

The wave produced at terminals 13 and 14 has an amplitude approximately equal to one-half that of the voltage across capacitor $C_1$ when it was initially charged. The duration of this wave, on the other hand, is dependent on the time delay, or propagation velocity, of the network. If the time delay is equal to $t_d$, then the pulse duration is approximately $2t_d$ because the wave initiated in the network must travel down the network to the end where it is reflected back to the port. As well established in the prior art (see, for example, appendix C of *Pulse, Digital and Switching Waveforms*, by J. Millman and H. Taub, McGraw-Hill Book Company, 1965), the time delay is related to the products of the values of the inductors and capacitors of the network. Because this is a product relationship while the driving-point impedance is a ratio relationship of these same values, components may be selected for a particular time delay (and therefore output wave duration) without affecting the driving-point impedance of the network. This independence between these two characteristics facilitates component selections for embodiments of the invention.

What is claimed is:

1. A sample and hold circuit comprising
a set of input terminals,
a set of output terminals,
a constant-K, one-port ladder network having poles at both zero and infinite frequencies and, furthermore, having a capacitor as the element closest to the port,
a load having an impedance value substantially equal to the driving-point impedance of said network and connected across said output terminals,
means connecting said network port to said output terminals, and
a sampling gate connected between said input terminals and the terminals of said capacitor closest to said network port to apply directly across said capacitor samples of waves applied to said input terminals.

2. A sample and hold circuit comprising
a set of input terminals,
a set of output terminals,
a constant-K, one-port ladder network comprising a plurality of high-pass, half-section, constant-K filters connected in series so that the capacitor of each filter is closer to the network port than the inductor of that filter,
a load having an impedance value substantially equal to the driving-point impedance of said network and connected across said output terminals,
means connecting said network port to said output terminals, and
a sampling gate connected between said input terminals and the terminals of the capacitor of said filter closest to said network port to apply directly across that capacitor samples of waves applied to said input terminals.

3. A sample and hold circuit comprising
a set of input terminals,
a set of output terminals,
a constant-K, one-port ladder network formed of capacitors and inductors with said capacitors in series connection and said inductors in shunt connection in said network and having poles at both zero and infinite frequencies,
a load having an impedance value substantially equal to the driving-point impedance of said network and connected across said output terminals,
means connecting the port of said network to said output terminals, and
a sampling gate connected between said input terminals and the terminals of the capacitor which is closest to the port of said network to apply directly across to that capacitor samples of waves applied to said input terminals.

4. A sample and hold circuit comprising
a set of input terminals,
a set of output terminals,
a constant-K, one-port ladder network having poles at both zero and infinite frequencies and, furthermore, having a driving-point impedance defined by the expression:

$$Z(s)=\frac{1}{C_1s}+\cfrac{1}{\cfrac{1}{L_1s}+\cfrac{1}{\cfrac{1}{C_2s}+\cfrac{1}{\cfrac{1}{L_2s}+\cfrac{1}{\cfrac{1}{C_3s}+\cdots}}}}$$

where
$Z(s)$ is the Laplace transform of said driving-point impedance,
$C_1, C_2, \ldots C_n$ are the values in farads of the capacitors of said network beginning with the capacitor closest to the port of said network,
$L_1, L_2, \ldots L_n$ are the values in henries of the inductors of said network beginning with the inductor closest to said port, and
$s$ is the complex number used in Laplace transformations,
a load having an impedance value substantially equal to said driving-point impedance and connected across said output terminals,
means connecting the port of said network to said output terminals, and
a sampling gate connected between said input terminals and the terminals of said capacitor closest to said port to apply directly across that capacitor samples of waves applied to said input terminals.

* * * * *